(12) United States Patent
Yopp et al.

(10) Patent No.: US 10,157,388 B2
(45) Date of Patent: Dec. 18, 2018

(54) GENERATING PROMOTIONS TO A TARGETED AUDIENCE

(75) Inventors: John Yopp, Minneapolis, MN (US); Charles Pilon, Saint Paul, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 711 days.

(21) Appl. No.: 13/401,990

(22) Filed: Feb. 22, 2012

(65) Prior Publication Data

US 2013/0218677 A1  Aug. 22, 2013

(51) Int. Cl.
*G06Q 30/02*  (2012.01)

(52) U.S. Cl.
CPC .................... *G06Q 30/02* (2013.01)

(58) Field of Classification Search
CPC ........................................ G06Q 30/02
USPC ............................. 705/14.58, 27.1
See application file for complete search history.

(56) References Cited

U.S. PATENT DOCUMENTS

| | | | | |
|---|---|---|---|---|
| 7,786,857 B2 * | 8/2010 | Yuba et al. | ............ | 340/539.13 |
| 7,802,724 B1 * | 9/2010 | Nohr | ............ | 235/384 |
| 7,930,204 B1 * | 4/2011 | Sharma et al. | ............ | 705/7.32 |
| 8,074,882 B2 * | 12/2011 | Dmitriev et al. | ............ | 235/383 |
| 2008/0059297 A1 * | 3/2008 | Vallier et al. | ............ | 705/14 |
| 2008/0228537 A1 * | 9/2008 | Monfried | ............ | G06Q 30/02 |
| | | | | 705/14.53 |
| 2009/0124241 A1 * | 5/2009 | Krishnaswamy | ...... | G06Q 30/02 |
| | | | | 455/414.2 |
| 2009/0184981 A1 | 9/2009 | de Matos | | |
| 2009/0235312 A1 | 9/2009 | Morad et al. | | |
| 2009/0259518 A1 * | 10/2009 | Harvey | ................ | G06Q 30/02 |
| | | | | 705/14.41 |
| 2011/0016483 A1 * | 1/2011 | Opdycke | ........................ | 725/14 |
| 2011/0060652 A1 * | 3/2011 | Morton | ...................... | 705/14.58 |
| 2011/0196724 A1 | 8/2011 | Fenton et al. | | |
| 2011/0276394 A1 | 11/2011 | Chan | | |
| 2012/0130796 A1 * | 5/2012 | Busch | ........................ | 705/14.36 |
| 2014/0109123 A1 * | 4/2014 | Balakrishnan | ..... | G06Q 30/0244 |
| | | | | 725/14 |

FOREIGN PATENT DOCUMENTS

WO   WO 2012139243 A1 *  10/2012

OTHER PUBLICATIONS

Allen, Michael Patrick, Understanding Regression Analysis, Plenum Press, 1997, all pages.*

(Continued)

*Primary Examiner* — Jacob C. Coppola
(74) *Attorney, Agent, or Firm* — Potomac Law Group, PLLC

(57) ABSTRACT

A system generates a targeted promotion for a group of consumers in a store. The system determines the group of consumers or an audience that are within a viewable area of a display during at least a portion of a time period. The system then generates a profile for each of the consumers and, based at least on the profiles and a goal of the store, determines the targeted promotion from multiple potential promotions. The system then displays the determined promotion on the display during the time period.

18 Claims, 4 Drawing Sheets

(56) References Cited

OTHER PUBLICATIONS http://www.immersivelabs.com/index.php/technology; Immersive Labs, 86 Chambers Suite 704, New York, NY 10007; page accessed Feb. 22, 2012.
http://singularityhub.com/2011/05/23/minority-report-scanners-are-coming-company-receives-15-million-to-develop-long-range-facial-recognition-technology/; page accessed Jan. 23, 2011.
http://www.nec.com/global/solutions/security/technologies/face_recognition.html; Copyright © NEC Corporation 1994-2011; page accessed Jan. 23, 2011.
http://www.guardian.co.uk/media/pda/2010/sep/27/advertising-billboards-facial-recognition-japan; PDA The Digital Content Blog; the guardian.co.uk; Sep. 27, 2010.
http://screenscape.net/foursquare; First Foursquare Application for Digital Signage Networks by ScreenScape; News Release, Sep. 14, 2010, Charlottetown, Prince Edward Island.
Ashlee Vance; "Innovator Erin Morrow, MassMotion's Algorithms bring wisdom to the virtual crowds"; Bloomberg Businessweek; Nov. 21-Nov. 27, 2011.
Oracle Data Sheet; "Oracle Real-Time Decisions"; copyright 2011.

\* cited by examiner

GENERATING PROMOTIONS TO A TARGETED AUDIENCE

FIELD

One embodiment is directed generally to a targeted advertising/promotion system, and in particular to a targeted advertising system through in-store video presentations.

BACKGROUND INFORMATION

Retailers generally spend a lot of time and money trying to engage consumers through promotions, whether using weekly coupon circulars, print or online ad campaigns, email blasts, or loyalty program benefits. These promotional campaigns tend to have very low redemption rates, in the single percentage digits, and the return on investment can be hard to correlate. Given this issue, retailers have become increasingly interested in targeting promotions more carefully to specific market segments or even individual consumers. However, targeted promotion campaigns are usually far removed from consumers' point of purchase decision in the store itself, given that in-store ads are typically generic (i.e., not targeted to specific consumers).

The growing saturation of smartphone device use by consumers has led to various approaches to advertising directly to consumers through leveraging their device's global positioning system ("GPS") location. One approach, referred to as "geo-fencing", allows a retailer to send a promotion to a consumer when their device's GPS location is within a specified area (usually near the retailer's own store or near a competitor's store). Other known approaches include using indoor location technologies to know when a consumer is near a given digital display, and updating the display to show a promotion targeted to that consumer.

SUMMARY

One embodiment is system that generates a targeted promotion for a group of consumers in a store. The system determines the group of consumers or an audience that are within a viewable area of a display during at least a portion of a time period. The system then generates a profile for each of the consumers and, based at least on the profiles and a goal of the store, determines the targeted promotion from multiple potential promotions. The system then displays the determined promotion on the display during the time period.

DETAILED DESCRIPTION

One embodiment is a digital display system located in a store that displays targeted advertisements/promotions based on the specific audience that is within a viewable area of the display. Embodiments determine how to target consumers within the store when the consumer is close to a purchase decision based on user profiles while also avoiding the need to use an entire digital display to target an individual consumer. Embodiments track the locations of consumers' mobile phones or other devices in the store, and one or more digital displays in the store display promotional content that is changed periodically based on targeting a blend of the consumers in the viewable area of the displays.

Figure 1:
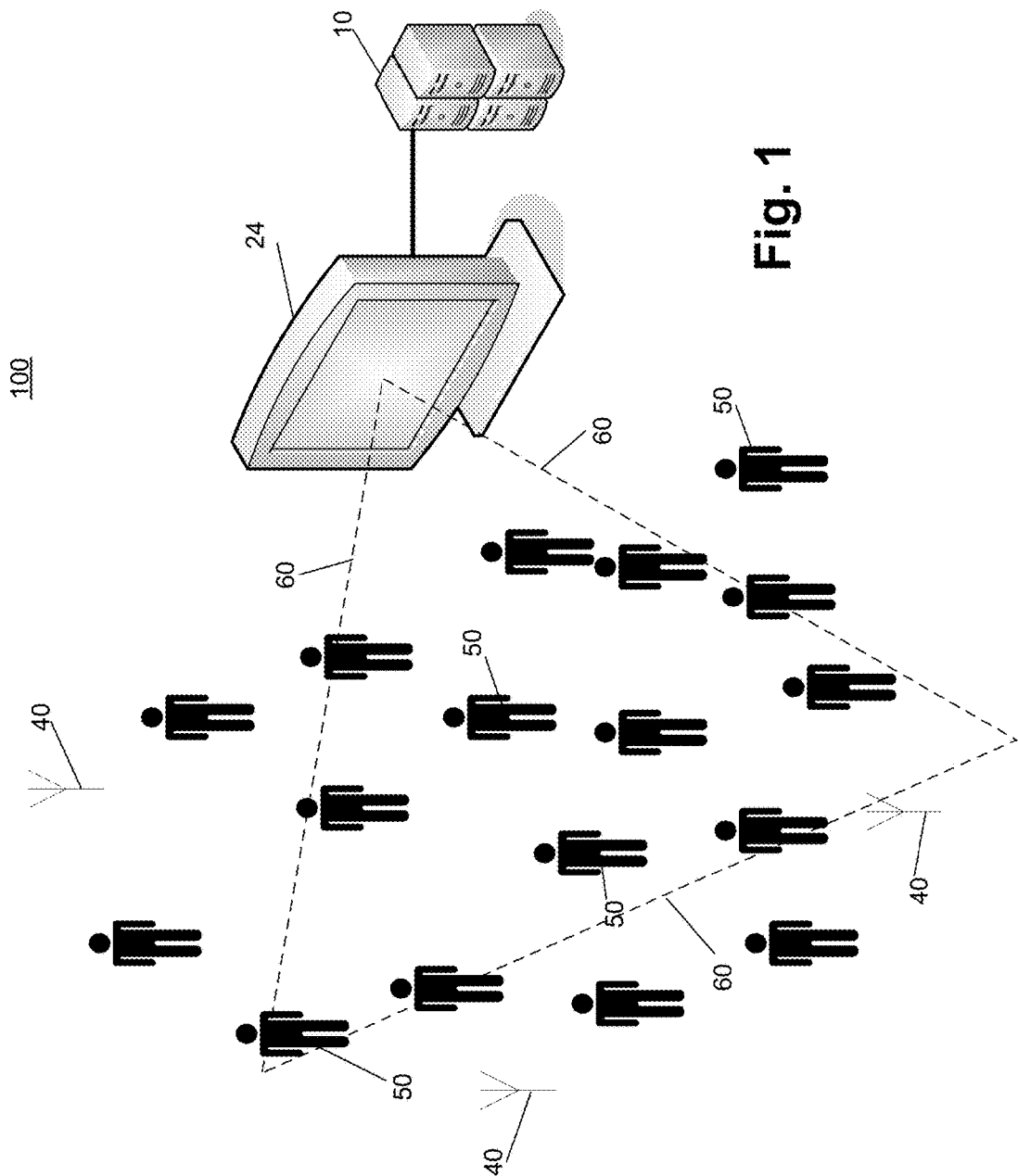
FIG. 1 is an overview diagram of the inside of a store of a retailer that incorporates an embodiment of the present invention.

FIG. 1 is an overview diagram of the inside of a store 100 of a retailer that incorporates an embodiment of the present invention. Store 100 includes many consumers, customers, shoppers, etc. (each referred to as "consumer 50"), and a digital display device 24 coupled to a computer server 10. Each consumer 50 carries a cellular telephone, smartphone, or other portable/mobile device that includes a machine identification ("ID"). Various wireless access points 40 scattered around store 100 track each mobile device, and consequently the location of each consumer 50.

Display 24 includes a viewable area, as indicated approximately by the area within lines 60. Consumers 50 located within lines 60 can generally view what is shown on display 24, assuming they are looking at display 24. Likewise, consumers 50 that are located outside of lines 60 can generally not easily view what is shown on display 24, even if they are looking at display 24, due to their distance away from display 24 and/or their angle of viewing from display 24. The viewable area depends on the characteristics of display 24 such as its size, brightness, viewable angle, etc. Although only a single display 24 is shown in FIG. 1, in most embodiments store 100 will include multiple displays 24 placed throughout the store, with each coupled to either a separate server 10 or the same server 10 via a network.

Figure 2:
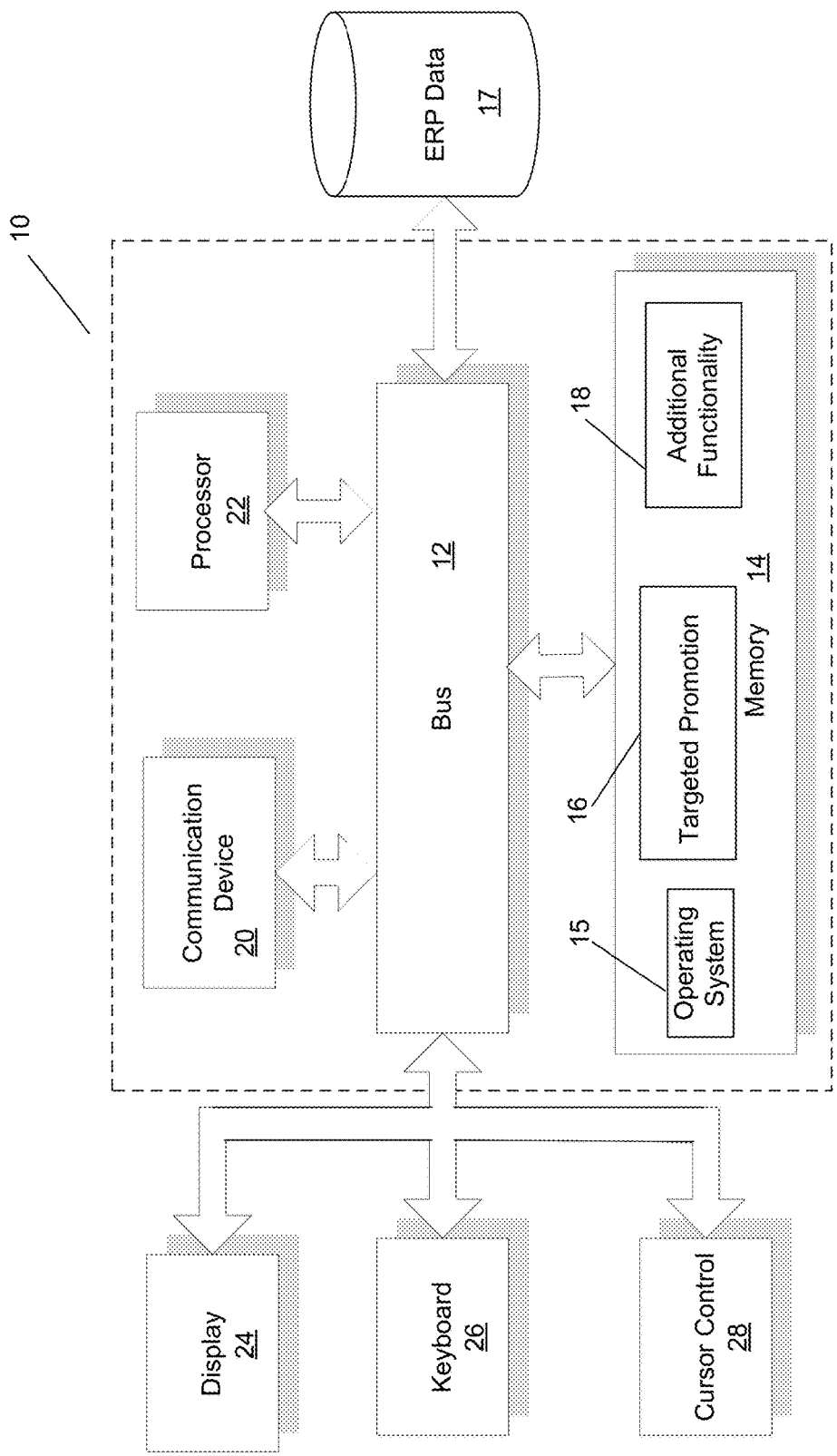
FIG. 2 is a block diagram of computer server/system of FIG. 1 that can implement an embodiment of the present invention.

FIG. 2 is a block diagram of computer server/system 10 of FIG. 1 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to display 24 of FIG. 1, such as a Liquid Crystal Display ("LCD"), for displaying promotions to a consumer/user. A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a targeted promotion module 16 that generates targeted promotions to a specific audience, as disclosed in more detail below. System 10 can be part of a larger system, such as retail product pricing system or an enterprise resource planning ("ERP") system. Therefore, system 10 will typically include one or more additional functional modules 18 to include the additional functionality. A database 17 is coupled to bus 12 to provide centralized storage for modules 16 and 18 and store pricing information, inventory information, ERP data, etc.

Referring again to FIG. 1, in one embodiment each consumer 50 opts into the store's loyalty program to register their mobile device machine ID. An incentive for the consumer to opt-in may be an offer of benefits to the consumer such as an automatic check-in to the store to provide the consumer with loyalty points or access to unique promotions. The opt-in registration includes a user profile, including demographic information of the consumer. Therefore, system 10 is provided with a link between each mobile device and the corresponding consumer 50, and through that to their shopping history and associated market segments that are associated with the consumer. This information is stored by system 10.

Display 24 in combination with server 10 can be any type of system capable of generating and displaying ad hoc content, such as the "Impact" digital signage system from Starmount Systems, Inc. Each digital display 24 inherently has a standard calculation of the area in front of it in which viewers can see an image on its screen (i.e., the "viewable area"), including factors such as aspect ratio, screen size, resolution, viewing angle, and longest viewing distance. This standard calculation is calculated and stored in server 10.

In one embodiment, the layout of store 100, including the location of fixtures such as display 24 and shelving, are stored and available as spatial data storage such as used in "Oracle Spatial" from Oracle Corp. The viewable area for each display 24 can be stored as location-based shapes in Oracle Spatial for each display in each store. The stored information in Oracle Spatial can be accessible remotely through web services.

Wireless access points 40 in one embodiment are part of a system for providing indoor location functionality that tracks the position of mobile devices or smartphones, such as a "Micro-Location" system from NearBuy Systems. Wireless access points 40 are a portion of the infrastructure, and the software functionality can be implemented by server 10. Embodiments can provide the location of each consumer with a minimum of one meter accuracy. Therefore, server 10 is able to track individual machine ID routes and locations throughout store 100. Server 10, via targeted promotion module 16, further includes functionality to:

Identify all mobile devices "dwelling" in a viewable area of display 24. A mobile device/user is "dwelling" if the user is already in the viewable area, or is close enough to the viewable area that the user may enter the viewable area upon further movement during a future time period.

Determine the probability that a consumer 50 will enter the viewable area of display 24 during a configurable percentage of a promotion advertisement playing time. This is based on at least the direction, path and speed of movement of each consumer 50 relative to the viewable area. An example of a configurable percentage is if the advertisement is 60 seconds long, the determination may be if a particular consumer will be able to view at least half (50%) of the advertisement and therefore if the consumer will be present in the viewable area for at least 30 seconds.

Determine the probability that a consumer 50 will leave the viewable area of display 24 during a configurable percentage of the advertisement playing time.

Determine the distance of each individual machine ID that is within the viewable area of display 24 from the display center point.

Generate a list of all machine IDs that will be within the viewable area of a display 24 during a given promotion.

In one embodiment, targeted promotion module 16 includes regression analysis functionality that receives the weighted factors of viewers in the display's viewable area (taking into account their proximity and motion), the associated market segments for the consumers, the department location within the store of the display, available promotions for the store location and length of time, available promotions for the store department and length of time, and the promotion goals of the retailer (such as margin expansion or increased market basket). In response, module 16 generates a promotion/advertisement that best matches the retailer's goals for the blended information for the consumers in the display's viewable area, or coming into the viewable area.

In one embodiment, the regression analysis functionality can be provided in part by "Real-Time Decisions" ("RTD") from Oracle Corp. RTD selects a promotion to send to an individual customer based upon the retailer's goals, and uses a weighting factor read from a database based upon the customer segment. In one embodiment, RTD is modified to account for having multiple customer segments represented by the consumers that are currently within the viewable area of the display. In one embodiment, the modification includes looking up the weighting factors for each represented customer segment and then weighting them by the number of consumers.

Figure 3:
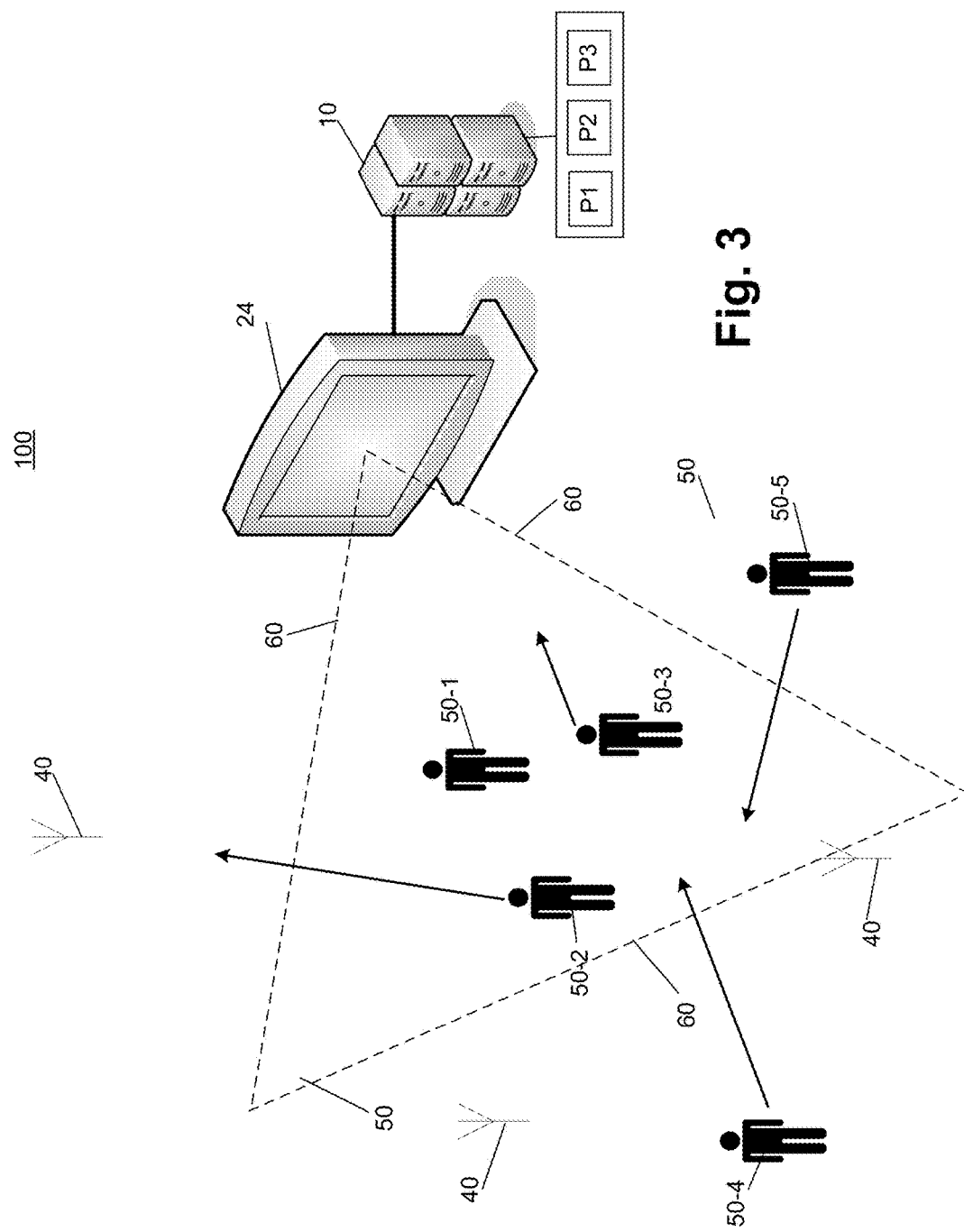
FIG. 3 is an overview diagram of the inside of a store of a retailer and provides an example scenario in accordance with one embodiment.

In one embodiment, the modification includes weighting the various consumers by their distance to the display, giving preference for those closer. In one embodiment, the modification includes weighting the various consumers by whether they are in motion or standing still, giving preference to those who are standing still. FIG. 3 is an overview diagram of the inside of a store of a retailer and provides an example scenario in accordance with one embodiment. In the scenario of FIG. 3, for example, there are three consumers (50-1, 50-2, 50-3) in separate customer segments in the viewable area. Consumer 50-1 is standing still, and therefore their customer segment gets a weight of two for the regression analysis. Consumer 50-2 is moving through the viewable area in the direction indicated by the arrow, and therefore their customer segment gets a weight of 1 in the regression analysis. Consumer 50-3 is moving in the direction indicated by the arrow, but is close to the display, and therefore their customer segment gets a weight of 1.5 in the regression analysis. There are three promotions available for that store, that department, and that time period. The retailer has an overall promotion goal of expanding the market basket. Of the possible promotions (P1, P2, P3), promotion P1 has a high affinity for the market basket goal for consumers 50-2 and 50-3, P2 has a high affinity for the goal for consumers 50-1 and 50-2, and P3 has a high affinity for consumer 50-3. Due to the weighting, promotion P2 is chosen for display.

Weighting can also be used to adjust for the probability that a consumer will be entering viewable area of display 24 as well as whether the consumer will be facing display 24 during the relevant time period. In FIG. 3, both consumers 50-4 and 50-5 are calculated to be within the viewable area based on their direction and speed of movement, as indicated by the arrows. However, consumer 50-4 is walking towards display 24, while consumer 50-5 is walking away from display 24. Therefore, consumer 50-4 may get a weighing factor for "facing display 24" of 3, and 50-5 only a weighting factor of 0.5. Since at any given moment module 16 knows, for each consumer, the current location, direction of movement, and speed of movement, more sophisticated calculations can be made to determine each consumer's position and orientation relative to display 24 for the relevant time period, and corresponding weighting factors can be applied to select the best promotion.

Further, a weighting can be based on whether a consumer is close to a purchase decision based on a user's profile. For example, if the user profile of consumer 50-1 indicates a purchase every week on the current day of the week, and the user profile of consumer 50-2 indicates only sporadic purchasing, the weighting factor for "propensity to purchase" for consumer 50-1 may be a 20, and it may only be a 2 for consumer 50-2.

If a selected promotion is not generally available to be shown on display 24, then based on preferences set in their loyalty accounts the promotion may be sent directly to the consumers' mobile devices. The promotion may be sent to the viewable area of the device as a Short Message Service ("SMS") message, loaded onto the device through scanning a bar code or Quick Response ("QR") code, automatically downloaded to the device if it includes Near Field Communication ("NFC") capability that could support promotions, or by any other known method.

Figure 4:
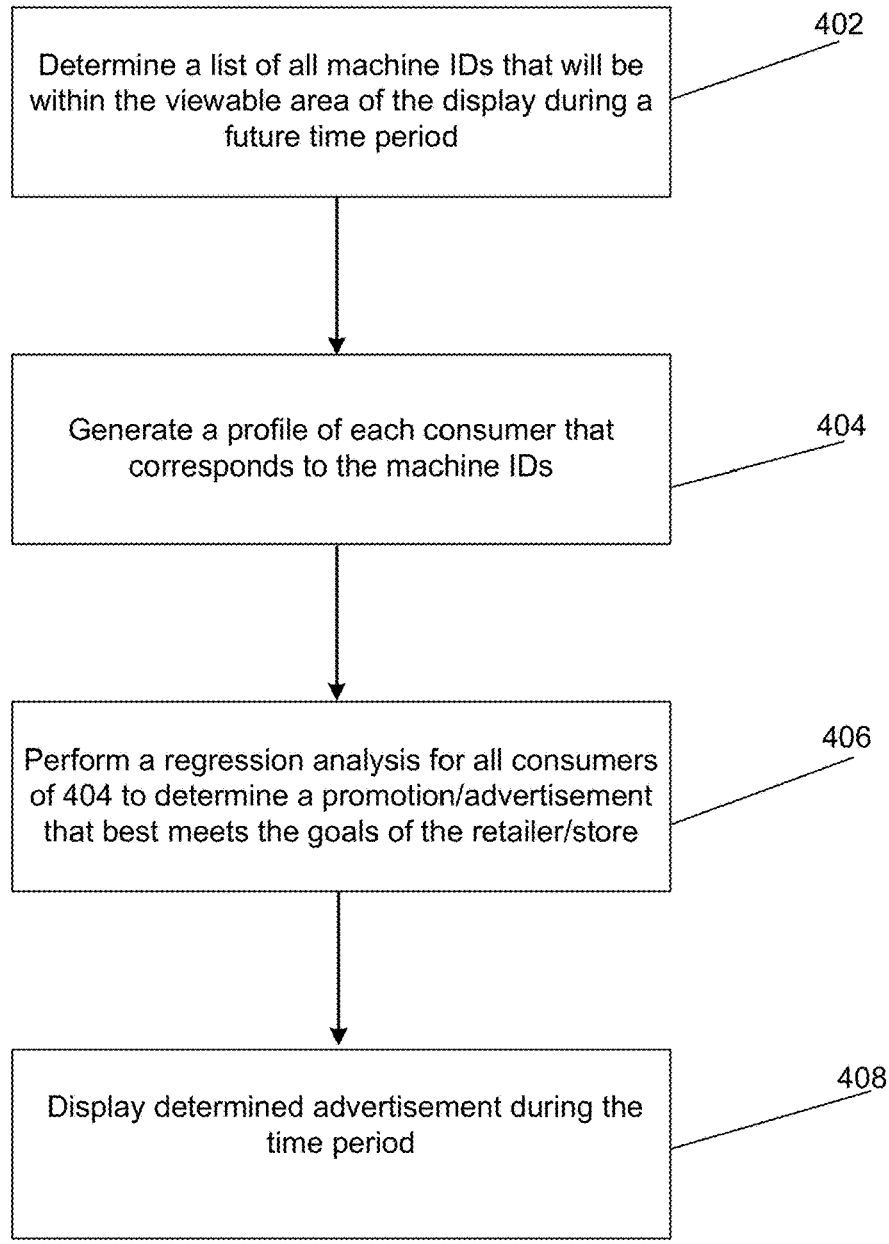
FIG. 4 is a flow diagram of the functionality of the targeted promotion module of FIG. 2 when determining and generating a targeted promotion based on a current audience in accordance with one embodiment.

FIG. 4 is a flow diagram of the functionality of targeted promotion module 16 of FIG. 2 when determining and generating a targeted promotion based on a current audience in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 4 is for a single display, such as display 24 in store 100 of FIG. 1. It is assumed, as described above, that each or most users/consumers 50 carry a mobile device with a machine ID that can be tracked via wireless access points 40. Thus, module 16 has the location of each consumer relative to display 24. Further, because each consumer 50 has enrolled in a loyalty program of store 100, module 16 has a profile, including demographic and past spending activity, of each consumer 50.

At 402, module 16 determines a list of all machine IDs that will be within the viewable area of a display 24 during a future time period. As disclosed above, this determination may be based on the current location and determined speed and direction of motion of the consumers 50 relative to display 24 and an upcoming time period (e.g., beginning in one minute).

At 404, module 16 generates a profile of each consumer that corresponds to the machine IDs of 402 within the viewable area of display 24. The profiles are initially stored for each consumer when the user enrolls in the store's loyalty program and can include stored data such as past purchases by the consumer, demographics of the consumer, and any other available data.

At 406, module 16 performs an analysis for all consumers of 404 to determine a promotion/advertisement that best meets the goals of the retailer/store 100. The regression analysis includes factors such as available promotions, time of day, etc. In one embodiment, the analysis is a regression analysis.

At 408, the determined advertisement is displayed on display 24 during the time period. The determined advertisement can be stored in database 17 of FIG. 1 with all other advertisements and can be retrieved and played using known methods.

As disclosed, embodiments of the present invention determine and display an advertisement that is selected based on the current audience in a viewing area of the display. Therefore, each advertisement has a broad impact while still being personalized for the specific audience.

Embodiments use a consumer's enrollment in a store's loyalty program to determine user's profiles. However, in other embodiments, freely available social media identifiers from the mobile devices may be used to determine profiles. Further, rather than determining what users are in a viewable area of the display, in other embodiments video analytics can be used to determine which users are actually viewing the display.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to generate a targeted promotion in a store, the generation comprising:

determine a subset of a plurality of consumers that are predicted to be within a viewable area of a display during at least a portion of a future time period, wherein each consumer has a mobile device, and each mobile device is linked to an account of the consumer, and the determine the subset comprises tracking the direction, path and speed of movement of each of the plurality of consumers relative to the viewable area using a system for providing indoor tracking of the mobile device;

generate a profile for each of the determined plurality of consumers predicted to be within the viewable area, wherein the profile is based on information of the consumer stored in the account of the consumer;

based at least on the profiles and a goal of the store, determine the targeted promotion from a plurality of promotions, wherein the targeted promotion is determined by a regression analysis that receives weighted factors for each customer segment that corresponds to the subset of the plurality of consumers that are predicted to be within the viewable area, the weighted factors comprising at least a proximity to the viewable area and a direction of motion relative to the viewable area; and display the determined promotion on the display during the future time period.

2. The computer readable medium of claim 1, wherein the mobile device comprises a machine identification.

3. The computer readable medium of claim 1, the weighted factors further comprising, for each subset of consumers, at least one of: a probability that the consumer will be entering the viewable area, a probability that the consumer will be facing the display, or a probability that the consumer is close to a purchase decision.

4. The computer readable medium of claim 3, wherein the determining the subset of the plurality of consumers comprises:
   identify consumers dwelling in the viewable area;
   determine a first probability that each consumer will enter the viewable area during a first portion of the time period; and
   determine a second probability that each consumer will leave the viewable area during a second portion of the time period.

5. The computer readable medium of claim 3, wherein the account comprises a loyalty program of the store.

6. The computer readable medium of claim 5, wherein the profile comprises demographic information for each consumer, and previous purchasing history for each consumer.

7. A computer implemented method for generating a targeted promotion in a store, the method comprising:
   determining a subset of a plurality of consumers that are predicted to be within a viewable area of a display during at least a portion of a future time period, wherein each consumer has a mobile device, and each mobile device is linked to an account of the consumer, and the determining the subset comprises tracking the direction, path and speed of movement of each of the plurality of consumers relative to the viewable area using a system for providing indoor tracking of the mobile device;
   generating a profile for each of the determined plurality of consumers predicted to be within the viewable area, wherein the profile is based on information of the consumer stored in the account of the consumer;
   based at least on the profiles and a goal of the store, determining the targeted promotion from a plurality of promotions, wherein the targeted promotion is determined by a regression analysis that receives weighted factors for each customer segment that corresponds to the subset of the plurality of consumers that are predicted to be within the viewable area, the weighted factors comprising at least a proximity to the viewable area and a direction of motion relative to the viewable area; and
   displaying the determined promotion on the display during the future time period.

8. The method of claim 7, wherein the mobile device comprises a machine identification.

9. The method of claim 7, the weighted factors further comprising, for each subset of consumers, at least one of: a probability that the consumer will be entering the viewable area, a probability that the consumer will be facing the display, or a probability that the consumer is close to a purchase decision.

10. The method of claim 9, wherein the determining the subset of the plurality of consumers comprises:
    identifying consumers dwelling in the viewable area;
    determining a first probability that each consumer will enter the viewable area during a first portion of the time period; and
    determining a second probability that each consumer will leave the viewable area during a second portion of the time period.

11. The method of claim 9, wherein the account comprises a loyalty program of the store.

12. The method of claim 11, wherein the profile comprises demographic information for each consumer, and previous purchasing history for each consumer.

13. A system that generates a targeted promotion in a store, the system comprising:
    a processor;
    a storage device coupled to the processor that stores instructions that comprise a targeted promotion module that, when executed by the processor, generates the targeted promotion, the targeted promotion module comprising:
    a viewable area module to determine a subset of a plurality of consumers that are predicted to be within a viewable area of a display during at least a portion of a future time period, wherein each consumer has a mobile device, and each mobile device is linked to an account of the consumer, and the determine the subset comprises tracking the direction, path and speed of movement of each of the plurality of consumers relative to the viewable area using a system for providing indoor tracking of the mobile device;
    a profile generation module to generate a profile for each of the determined plurality of consumers predicted to be within the viewable area, wherein the profile is based on information of the consumer stored in the account of the consumer;
    a determine promotion module that, based at least on the profiles and a goal of the store, determines the targeted promotion from a plurality of promotions, wherein the targeted promotion is determined by a regression analysis that receives weighted factors for each customer segment that corresponds to the subset of the plurality of consumers that are predicted to be within the viewable area, the weighted factors comprising at least a proximity to the viewable area and a direction of motion relative to the viewable area; and
    a display module that displays the determined promotion on the display during the future time period.

14. The system of claim 13, wherein the mobile device comprises a machine identification.

15. The system of claim 13, the weighted factors further comprising, for each subset of consumers, at least one of: a probability that the consumer will be entering the viewable area, a probability that the consumer will be facing the display, or a probability that the consumer is close to a purchase decision.

16. The system of claim 15, wherein the determine the subset of the plurality of consumers comprises:
    identify consumers dwelling in the viewable area;
    determine a first probability that each consumer will enter the viewable area during a first portion of the time period; and
    determine a second probability that each consumer will leave the viewable area during a second portion of the time period.

17. The system of claim 15, wherein the account comprises a loyalty program of the store.

18. The system of claim 17, wherein the profile comprises demographic information for each consumer, and previous purchasing history for each consumer.

* * * * *